(12) United States Patent
du Quesne et al.

(10) Patent No.: US 10,259,279 B2
(45) Date of Patent: Apr. 16, 2019

(54) MACHINE FOR UNSEATING A TIRE BEAD FROM A WHEEL

(71) Applicants: Bertrand du Quesne, Antwerp (BE); Francis du Quesne, Antwerp (BE)

(72) Inventors: Bertrand du Quesne, Antwerp (BE); Francis du Quesne, Antwerp (BE)

(\*) Notice: Subject to any disclaimer, the term of this patent is extended or adjusted under 35 U.S.C. 154(b) by 168 days.

(21) Appl. No.: 15/291,252

(22) Filed: Oct. 12, 2016

(65) Prior Publication Data
US 2017/0100971 A1    Apr. 13, 2017

(30) Foreign Application Priority Data

Oct. 12, 2015    (EP) .................................... 15002898

(51) Int. Cl.
*B60C 25/13*    (2006.01)
*B60C 25/05*    (2006.01)

(52) U.S. Cl.
CPC .......... *B60C 25/13* (2013.01); *B60C 25/0572* (2013.01)

(58) Field of Classification Search
CPC ....... B60C 25/13; B60C 25/02; B60C 25/025; B60C 25/132; B60C 25/04; B60C 25/138; B60C 25/0572
See application file for complete search history.

(56) References Cited

U.S. PATENT DOCUMENTS

| 3,165,142 | A | * | 1/1965 | Tabordon | B60C 25/138 |
| | | | | | 157/1.17 |
| 3,780,785 | A | | 12/1973 | Schultz | |
| 3,847,198 | A | * | 11/1974 | Brosene, Jr. | B60C 25/02 |
| | | | | | 157/1.24 |
| 4,222,426 | A | * | 9/1980 | Brosene, Jr. | B60C 25/025 |
| | | | | | 157/1.28 |
| 4,804,030 | A | * | 2/1989 | Mandelko | B60C 25/132 |
| | | | | | 157/1.17 |
| 2006/0151121 | A1 | * | 7/2006 | Baker | B60C 25/13 |
| | | | | | 157/1.17 |

FOREIGN PATENT DOCUMENTS

BE     1005417 A6     7/1993

OTHER PUBLICATIONS

Quin Huang et al., "Composite Organic Radical-Inorganic Hybrid Cathod for Lithium-ion Batteries," Journal of Power Sources, vol. 233, Jan. 22, 2013, p. 69-73.

\* cited by examiner

*Primary Examiner* — Robert J Scruggs
(74) *Attorney, Agent, or Firm* — Christopher Casieri

(57) ABSTRACT

Machine for unseating a tire bead from a wheel, comprising a stand designed to rest on the ground, a bearing plate for the wheel, and a bead unseating tool which is connected to a tool bearing structure mobilely mounted to the stand. The machine comprises a pneumatic actuator for setting the tool bearing structure in motion in order to operate the tool, and a shock absorber connecting the tool bearing structure to the stand in order to damp the movement of the tool bearing structure, particularly at the moment at which the tire bead unseats from the rim of the wheel.

10 Claims, 5 Drawing Sheets

MACHINE FOR UNSEATING A TIRE BEAD FROM A WHEEL

FIELD OF THE INVENTION

The invention relates to the field of machines for unseating a tire bead from a wheel, an operation that is a necessary prerequisite to the actual removal of the tire.

The invention also relates to a machine for fitting and removing a tire including a tire bead unseating machine or device.

PRIOR ART

Machines for unseating a tire bead from a wheel are known, for example, from American patent U.S. Pat. No. 3,780,785.

In this known machine, the wheel is placed on a horizontal bearing plate which is mounted on an upper face of a stand. The bead unseating tool (sometimes also referred to as a "bead breaker shoe") is mounted to a vertical pillar able to move in a guided manner downward in order to bring the bead unseating tool closer to the tire and then push the bead of the tire downward so that this bead detaches from the rim. The pillar is made up of the cylinder of a hydraulic cylinder actuator the piston of which is connected to the stand of the machine via a piston rod. By actuating said cylinder actuator, the tool will therefore move vertically downward and forcibly, which will bring the tool into its working stroke. In the case of a double-acting cylinder actuator, actuating the same in the opposite direction allows the tool to be returned to a position of rest so that the wheel can be taken out of the machine.

Although such a machine works well, it is relatively expensive and requires a fair amount of maintenance.

SUMMARY OF THE INVENTION

It is an object of the invention to provide a machine for unseating a tire bead from a wheel rim that is less expensive than the known machines.

The invention is defined by the independent claims. The dependent claims define preferred embodiments of the invention.

According to the invention, there is provided a machine for unseating a tire bead from a wheel, comprising:
a stand designed to rest on the ground,
a bearing plate against which to rest one lateral side of the wheel,
a bead unseating tool facing the bearing plate and mounted to a tool bearing structure, said tool bearing structure being mobilely mounted on the stand,
an actuator connected to the stand and to the tool bearing structure and configured to set the tool bearing structure in motion so as to move the bead unseating tool toward the bearing plate,
wherein
said actuator is a pneumatic actuator, and
the bead unseating machine further comprises a shock absorber mounted between the tool bearing structure and the stand in order to damp the movement of the tool bearing structure when it is set in motion by said actuator.

Specifically, with such a machine there is no longer a need to use a double-acting hydraulic cylinder actuator in order to operate the bead unseating tool, or to provide a hydraulic pump for actuating said cylinder actuator, and this greatly reduces the cost of the machine. This is because a pneumatic actuator represents better value for money and requires less maintenance than a double-acting hydraulic cylinder actuator. Although a pneumatic actuator requires compressed air in order to operate, compressed air sources are generally already available on site, even if only for inflating the tire after it has been fitted, and there is therefore no need for the machine to comprise a compressor, once again reducing the cost. All that is required is a simple pneumatic coupling for connecting the pneumatic actuator to said compressed air source. The presence of the shock absorber also makes it possible to damp the movement of the tool bearing structure, particularly at the moment at which the bead of the tire detaches from the wheel rim and after unseating has occurred, thereby reducing shocks and vibrations that might otherwise occur when the resistance put up by the tire collapses following the unseating of the tire bead.

The combination of the pneumatic actuator and of the shock absorber thus makes it possible to reduce the cost of the machine overall, while at the same time reducing the amplitude of the shocks and vibrations at the moment of unseating and therefore the wear on the components and/or the fatigue of materials.

Preferably, the shock absorber is a telescopic shock absorber, the cylinder of which is connected to the tool bearing structure or to the stand, and the piston of which is connected respectively to the stand or to the tool bearing structure via a piston rod. More preferably, the shock absorber is a hydraulic shock absorber. Such shock absorbers are in fact widely available in the market place and are relatively inexpensive.

Preferably, the shock absorber has a damping coefficient that differs according to whether the shock absorber is acting in one direction or in the opposite direction, which makes it possible to limit the acceleration of the tool bearing structure when it moves to operate the bead unseating tool (=in one direction) more greatly than when it moves to return the tool to a rest position (=in the opposite direction).

Preferably, the actuator is an inflatable air cushion, one face of which is connected to—or butts against—the stand, and an opposite face of which is connected to—or butts against—the tool bearing structure, said air cushion comprising at least one compressed air inlet. Inflatable air cushions are in fact widely available in the market place and are relatively inexpensive. These may for example be the inflatable air cushions commonly used as shock absorbers in heavy goods vehicles.

Preferably, the bearing plate forms an angle comprised between 0° and 10° with respect to a horizontal plane, the tool bearing structure comprises a pillar mounted with the ability to move in a guided linear translational movement with respect to the stand, and the actuator is configured to set the tool bearing structure in motion in said linear translational movement.

More preferably, the axis of the cylinder of the shock absorber is parallel to or coincident with the axis of the pillar, which makes it possible to use simple mechanical connections and damp shocks even better.

Even more preferably, the cylinder of the shock absorber is connected to the stand and the piston of the shock absorber is connected to the tool bearing structure via the piston rod. In this way, the opening of the cylinder, via which the piston rod emerges, will be situated above the piston and the risk of leaks of hydraulic fluid will be limited. The shock absorber will thus require less maintenance.

BRIEF DESCRIPTION OF THE FIGURES

These aspects, together with other aspects of the invention, will be clarified in the detailed description of particular embodiments of the invention, reference being made to the drawings of the figures in which.

The drawings of the figures are not drawn to scale. In general, elements that are similar are denoted by similar references in the figures.

DETAILED DESCRIPTION OF PARTICULAR EMBODIMENTS

Figure 1:
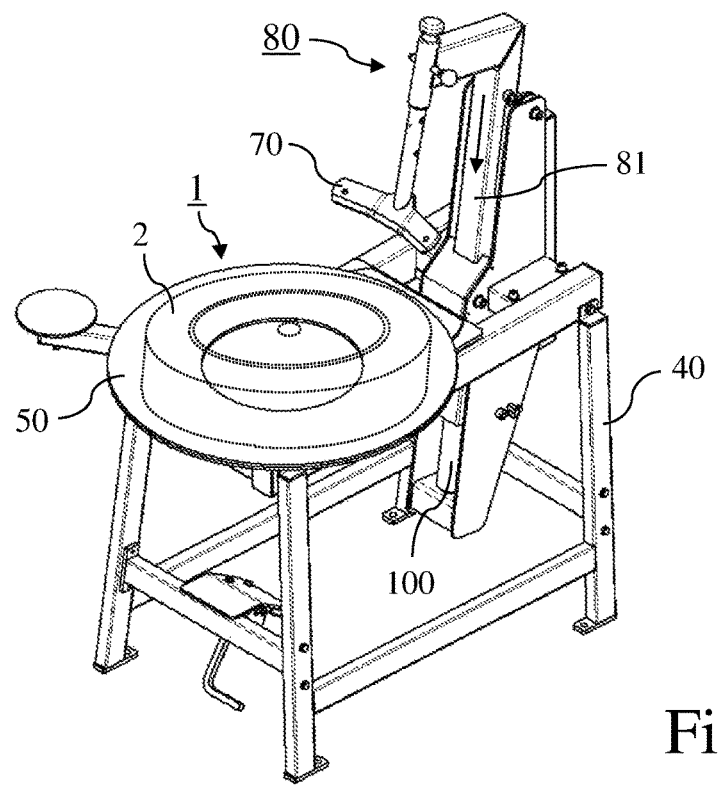
FIG. 1 shows a perspective view of a machine according to the invention.

FIG. 1 shows a perspective view of one example of the machine according to the invention. This machine comprises a stand (40), designed to rest on the ground, said stand (40) being surmounted by a bearing plate (50) against which to rest one lateral side of a wheel (1). Preferably, the bearing plate (50) forms an angle comprised between 0° and 10° with respect to a horizontal plane.

Facing the bearing plate (50) is a bead unseating tool (70) (sometimes referred to as a "bead breaker shoe") used to unseat the tire bead from the wheel rim. Such a tool is well known in the prior art. The bead unseating tool (70) is mounted to a tool bearing structure (80). Said tool bearing structure (80) is mounted mobilely to the stand (40) so as to be able to move the tool toward one sidewall (24) of the tire (2) or away therefrom. Preferably, as FIG. 1 shows, the tool bearing structure (80) comprises a pillar (81) mounted with the ability to move in guided linear translation with respect to the stand (40). In this case, the axis of translation will preferably be offset with respect to the vertical by an angle α (alpha) comprised between 0 and 15°, as can best be seen in FIGS. 2 and 3. This has the effect of making the tire (2) easier to unseat.

In order to set the tool bearing structure (80) in motion so as to move the bead unseating tool (70) toward the bearing plate (50), it is possible to use an angular movement rather than using a movement of linear translation. In that case, the tool bearing structure (80) may for example be mounted to the stand (40) by means of a pivot of horizontal axis.

Although this is not essential, the tool (70) is, in this example, mounted at a distal end of a tube which is driven into a sleeve that forms part of the tool bearing structure (80). As FIG. 1 shows, the tube and the sleeve are pierced with holes that can come into alignment, thereby allowing the tube to be fixed to the sleeve, for example using a pin, and at various heights with respect to the bearing plate (50), so as to be able to accommodate different widths of rim.

The machine also comprises an actuator (90) connected to the stand (40) on the one hand and to the tool bearing structure (80) on the other. This actuator (90) is configured to set the tool bearing structure (80) in motion so as to move the bead unseating tool (70) toward the bearing plate (50). In the example of FIG. 1, the actuator (90) is configured to set the tool bearing structure (80) in motion in a linear translational movement as indicated by an arrow in FIG. 1.

According to the invention, said actuator (90) is a pneumatic actuator. For further details regarding an example of an actuator (90) please refer to FIG. 4.

The machine further comprises a shock absorber (100) mounted between the tool bearing structure (80) and the stand (40). This shock absorber (100) makes it possible to damp the movement of the tool bearing structure (80) with respect to the stand (40) when said tool bearing structure (80) is set in motion by the actuator (90). For further details regarding this shock absorber (100) please refer to FIGS. 5 and 6.

Figure 2:
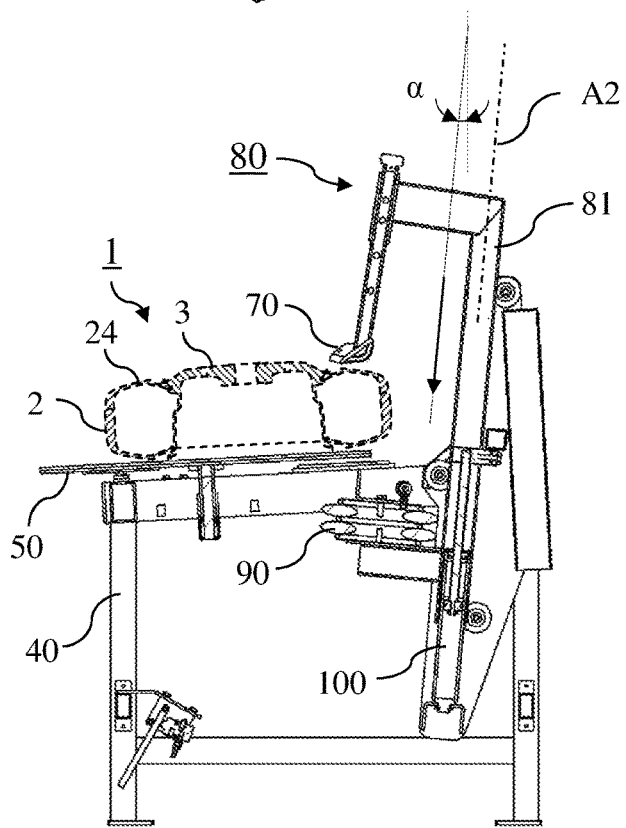
FIG. 2 shows a side view of the machine of FIG. 1 in the rest position.

FIG. 2 shows a side view of the machine of FIG. 1 when the tool bearing structure (80) is in the rest position, namely when the tool bearing structure (80) and therefore the bead unseating tool (70) are in a raised position to allow an operator to place the wheel (1) on the bearing plate (50) without being impeded by the tool. In this rest position, neither the actuator (90) nor the shock absorber (100) are active.

Figure 3:
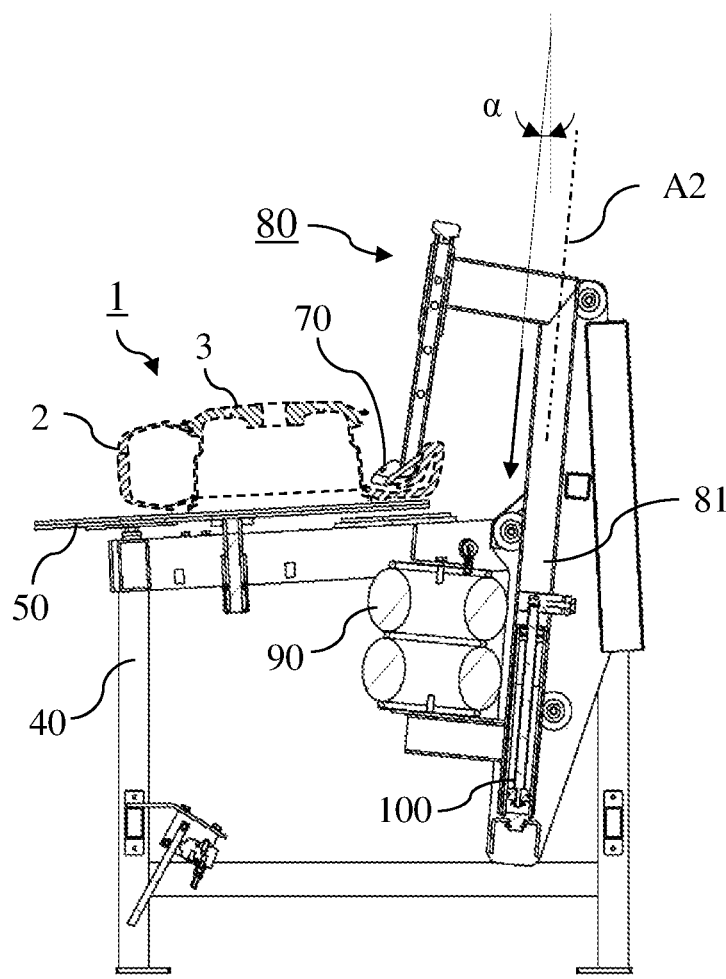
FIG. 3 shows a side view of the machine of FIG. 1 in the end-of-work position.

FIG. 3 shows a side view of the machine of FIG. 1 in the end-of-work position, namely when the tool bearing structure (80), and therefore the bead unseating tool (70), is in a lowered position after unseating the bead of the tire (2).

Figure 4:
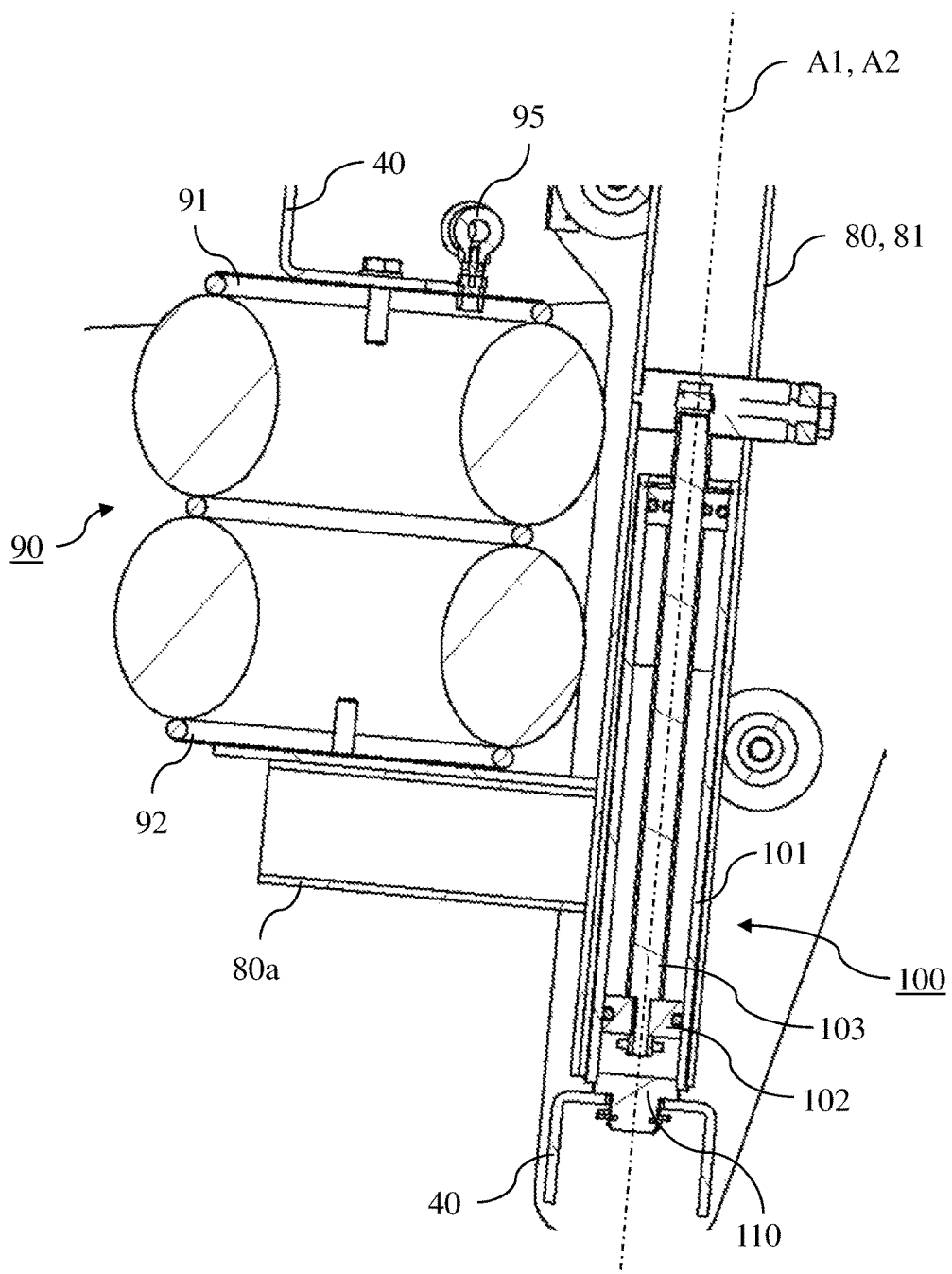
FIG. 4 shows a detailed view of part of the machine of FIG. 1.

FIG. 4 shows a detailed view of part of the machine of FIG. 1. Here may be seen the actuator (90) and the shock absorber (100) as well as the way in which these two elements are connected to the stand (40) and to the tool bearing structure (80).

In this example, the actuator (90) is an inflatable air cushion one face (91) of which is connected to—or butts against—the stand (40) and an opposite face (92) of which is connected to—or butts against—the tool bearing structure (80).

In this example, the tool bearing structure (80) comprises an end stop (80*a*) against which said opposite face of the air cushion (90) rests, but it goes without saying that many other forms of embodiment are possible. The air cushion (90) comprises a compressed air inlet (95), so that it can be inflated by connecting the compressed air inlet (95) to a compressed air source via a controllable valve. If this valve is opened, the air cushion will inflate and will forcibly cause the tool bearing structure (80) and therefore the bead unseating tool (70) to descend toward the sidewall (24) of the tire (2) in order to unseat same. Said valve will also have an exhaust position allowing the pressure in the air cushion to be released when the tire is recalibrated. Said valve may for example be a three-way valve.

In FIG. 4, the air cushion is shown inflated.

The pneumatic actuator (90) may be of any other type, such as, for example, a pneumatic cylinder actuator. Whatever its type, the pneumatic actuator (90) is rated to be able to apply to the mobile structure a force that may for example reach 5000 N to 25000 N for unseating the beads of a tire (2) from a car wheel (1). In this case, the travel of the pneumatic actuator (90) may be comprised between 5 cm and 35 cm.

The shock absorber (100) is a telescopic shock absorber of which the cylinder (101) may be connected to the stand (40) or to the tool bearing structure (80) and of which the piston (102) may respectively be connected to the tool bearing structure (80) or to the stand (40) via a piston rod (103). Preferably, it is a hydraulic shock absorber.

Figure 5:
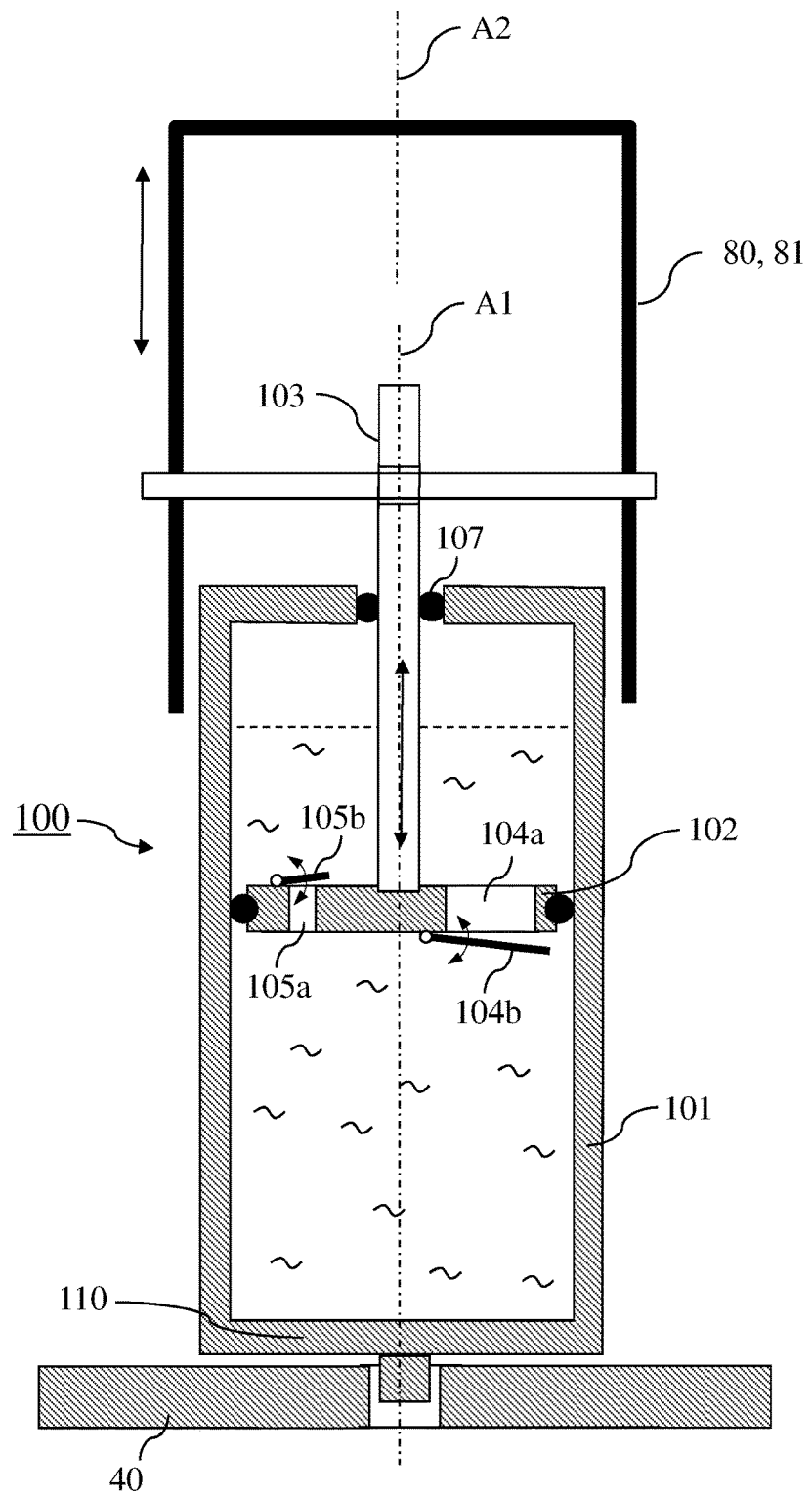
FIG. 5 schematically shows a view in longitudinal section of one example of a shock absorber of a machine according to the invention.

FIG. 5 schematically shows a view in longitudinal section of one example of such a shock absorber (100).

It comprises a cylinder (101) containing a piston (102) connected to a piston rod (103), said piston rod (103) emerging from the cylinder (101) through an opening (107) fitted with a seal. The cylinder (101) is partially filled with a hydraulic fluid, such as oil for example. The level of hydraulic fluid in the cylinder (101) is indicated by a dashed line in FIG. 5. The space in the cylinder (101) situated above this level is filled with a gas, for example air. The piston (102) preferably includes one or several circumferential seals in order to provide sealing between the piston (102) and the cylinder (101). In this case, the piston (102) also has at least one relatively small-diameter hole passing axially through it in order to slow the flow of the hydraulic fluid from one side of the piston (102) to the other when this piston is set in motion, thereby providing the damping effect. Preferably, the at least one hole is a calibrated hole. In instances in which the piston (102) does not include circumferential seal(s), this hole is not essential because the hydraulic fluid will be able to pass between the piston and the cylinder, thereby also providing the damping effect. This latter instance is, however, less preferable because the damping coefficient will be dependent on dimensional variations at the time of manufacture and will therefore be less predictable.

Preferably, the piston (102) includes one or more circumferential seals and the piston (102) has passing axially through it a first hole (104a) of a first diameter and a second hole (105a) of a second diameter, the first diameter being greater than the second diameter. The first hole (104a) in this case is provided with a first valve (104b) configured to allow the hydraulic fluid to pass as the piston approaches the closed end of the cylinder (110) and not to allow the hydraulic fluid to pass when the piston is moving away from the closed end of the cylinder (110) (just like a so-called "nonreturn" valve). The second hole (105a) is optionally fitted with a second valve (105b) configured to allow the hydraulic fluid to pass as the piston approaches the closed end of the cylinder (110) and not to allow the hydraulic fluid to pass when the piston is moving away from the closed end of the cylinder (110) (just like a so-called "nonreturn" valve). In this way, the shock absorber (100) will have a damping coefficient that differs according to whether the shock absorber (100) is acting in one direction or in the opposite direction.

In the example of FIG. 5, given the position of the valves and the fact that the first diameter is greater than the second diameter, the damping coefficient will be greater as the piston (102) descends down inside the cylinder (101) than as it rises up out of the cylinder (101). Therefore, the damping is greater when the bead unseating tool (70) is in its downward movement, namely its working movement for unseating the bead of the tire (2), than when it is in its upward movement, namely its movement returning to its rest position.

This asymmetric damping effect has been designed by the inventors because it offers the advantage of damping the movement of the tool bearing structure (80) more greatly when it is in its working movement, particularly when the tire (2) has its bead unseated, than when said tool bearing structure (80) is returning to its rest position.

Figure 6:
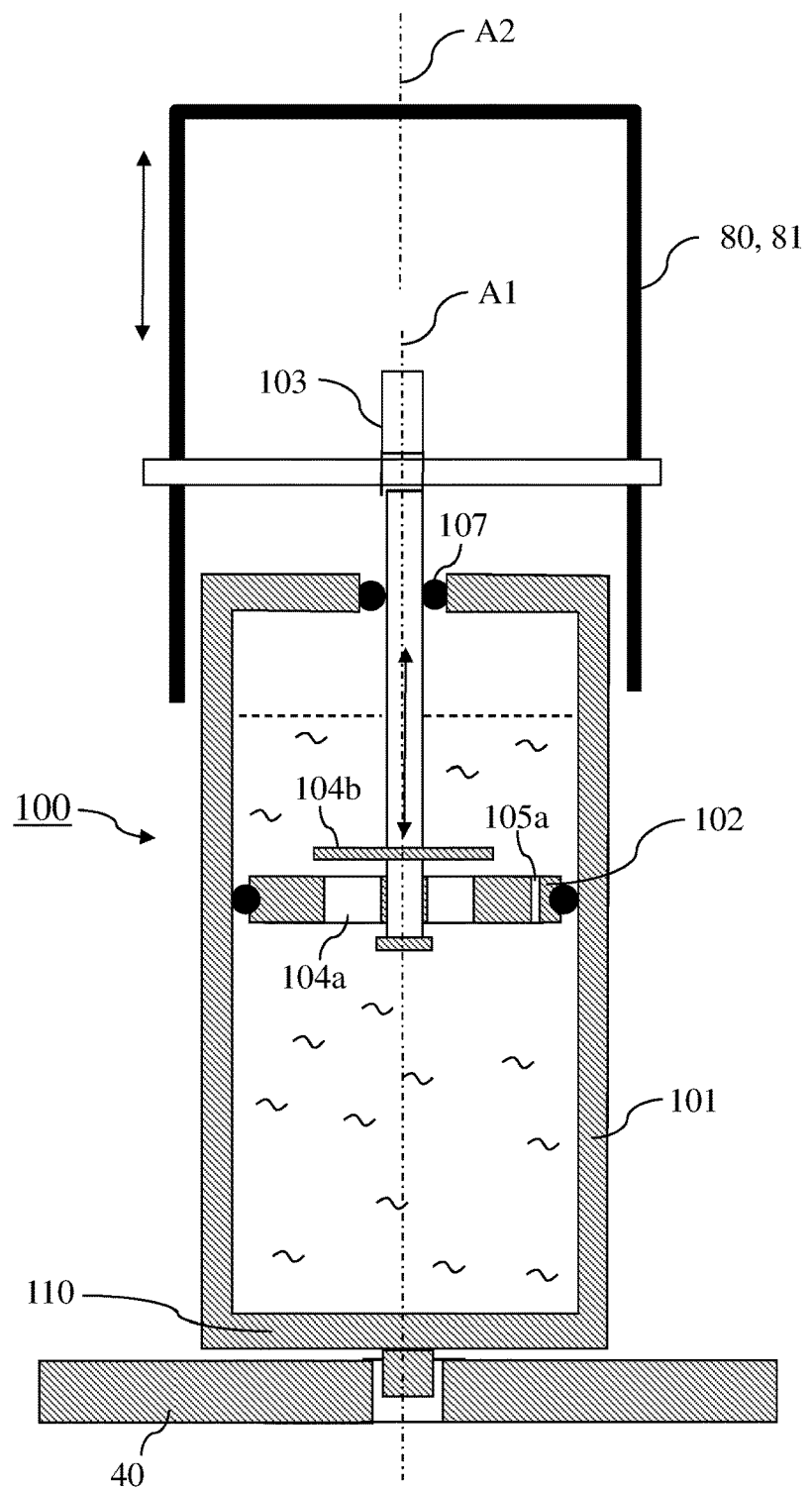
FIG. 6 schematically shows a view in longitudinal section of another example of a shock absorber of a machine according to the invention.

FIG. 6 schematically shows a view in longitudinal section of another example of such a shock absorber (100). Here, the piston (102) is slideably mounted to the piston rod (103) and between two disks which are fixed to the rod on each side of the piston (102). The upper disk (104b) has a diameter greater than the diameter of the first hole (104a) and will therefore block the first hole (104a) when the tool bearing structure (80) (and therefore the piston rod (103)) is pushed downward by the pneumatic actuator (90), whereas it will uncover the first hole (104a) when the tool bearing structure (80) (and therefore the piston rod (103)) is pulled upward, which will result in the same asymmetric behavior as that of the shock absorber (100) of FIG. 5.

It goes without saying that the piston (102) may comprise several first holes (104a) and/or several second holes (105a). In this case, it must be understood that the first diameter is the sum of the diameters of the first holes and that the second diameter is the sum of the diameters of the second holes.

It will be obvious to a person skilled in the art that many other configurations are possible in order to arrive at said asymmetry in the way in which the shock absorber (100) behaves.

In the case of a machine for unseating the bead of a tire (2) from a car wheel (1), it is possible for example to provide a hydraulic shock absorber (100) of which the cylinder (101) has a diameter comprised between 30 mm and 50 mm, of which the piston rod (103) has a diameter comprised between 15 mm and 25 mm, of which the second hole (105a) has a diameter comprised between 1 mm and 5 mm, and of which the first hole (104a) has a diameter comprised between 6 mm and 10 mm.

Preferably, the axis (A1) of the cylinder (101) of the shock absorber (100) is parallel to or coincident with the axis (A2) of the pillar (81), as can best be seen in FIG. 4.

As illustrated in FIGS. 4, 5 and 6, the cylinder (101) of the shock absorber (100) is preferably connected to the stand (40), and the piston (102) of the shock absorber (100) is preferably connected to the tool bearing structure (80) via the piston rod (103), thereby limiting the risks of leaks of hydraulic fluid still present in the bottom part of the cylinder (101).

In order to raise the tool bearing structure (80) again after the unseating of the tire (2), it is possible to provide elastic means connected between the stand (40) and the tool bearing structure (80). Said elastic means may for example comprise one or more springs mounted in such a way that they become more highly stressed as the bead unseating tool (70) approaches the bearing plate (50). Thus, when the pneumatic pressure in the actuator (90) is released, the spring(s) will automatically bring the bead unseating tool (70) away from the bearing plate (50).

Preferably, said elastic means comprise at least one thrusting gas spring mounted between the tool bearing structure (80) and the stand (40). Such gas springs are known and may for example be those commonly used for raising the tailgate or trunk lid of a motor car for example. Preferably, said springs are mounted in such a way that their axis is parallel to or coincident with the axis (A1) of the cylinder (101) of the shock absorber (100).

To sum up, the invention may also be described as follows: a machine for unseating the bead of a tire (2) from a wheel (1), comprising a stand (40) designed to rest on the ground, a bearing plate (50) for the wheel (1), and a bead unseating tool or bead breaker shoe (70) connected to a tool bearing structure (80) mounted mobile to the stand (40). The machine comprises a pneumatic actuator (90) to set the tool bearing structure (80) in motion so as to operate the tool, and a shock absorber (100) connecting the tool bearing structure (80) to the stand (40) so as to damp the movement of the tool bearing structure (80), particularly at the moment at which the bead of the tire (2) unseats from the rim (3) of the wheel (1).

The invention also relates to a machine for fitting and removing a tire with respect to a wheel including a machine for unseating the bead of the tire from the wheel as described hereinabove. In this case, the stand of the tire fitting and removing machine may for example be the same as the stand (40) of the machine for unseating the bead of the tire (2) as described hereinabove and may also comprise a device for fitting and removing the tire (2) of which many designs exist in the prior art. In this case, the bearing plate (50) will preferably be mounted with the ability to rotate with respect to the stand (40) so as to be able to operate the device for fitting and removing the tire (2).

The present invention has been described in conjunction with specific embodiments which are of purely illustrative value and must not be considered to be limiting. In general, it would seem obvious to a person skilled in the art that the present invention is not restricted to the examples illustrated and/or described hereinabove. The presence of reference numerals in the drawings cannot be considered to be limiting even when these numbers are indicated in the claims. The use of the verbs "to comprise", "to include", "to have" or any variations thereon and conjugations thereof cannot in any way exclude there being elements present other than those mentioned. The use of the indefinite article "a", "an" or of the definite article "the" when introducing an element does not exclude there being a plurality of such elements.

The invention claimed is:

1. A machine for unseating a tire bead from a wheel, comprising:
    a stand designed to rest on the ground,
    a bearing plate against which to rest one lateral side of the wheel,
    a bead unseating tool facing the bearing plate and mounted to a tool bearing structure, said tool bearing structure being mobilely mounted on the stand,
    an actuator connected to the stand and to the tool bearing structure and configured to set the tool bearing structure in motion so as to move the bead unseating tool toward the bearing plate,
    said actuator is a solely pneumatic actuator,
    wherein
    the bead unseating machine further comprises a telescopic shock absorber, a cylinder of which is connected to the tool bearing structure or to the stand and a piston of which is connected respectively to the stand or to the tool bearing structure via a piston rod,
    and wherein the shock absorber has a damping coefficient that differs according to whether the shock absorber is acting in one direction or in the opposite direction.

2. The machine as claimed in claim 1, wherein the shock absorber is a hydraulic shock absorber.

3. The machine as claimed in claim 1, wherein the cylinder of the shock absorber is connected to the stand and the piston of the shock absorber is connected to the tool bearing structure via the piston rod.

4. The machine as claimed in claim 1, wherein the shock absorber has a damping coefficient that is greater as the piston approaches a closed end of the cylinder than as the piston moves away from the closed end of the cylinder.

5. The machine as claimed in claim 4, wherein the axis of the shock absorber is parallel to or coincident with the axis of the pillar.

6. The machine as claimed in claim 1, wherein the actuator is an inflatable air cushion one face of which is connected to—or butts against—the stand and an opposite face of which is connected to—butts against—the tool bearing structure, said air cushion comprising at least one compressed air inlet.

7. The machine as claimed in claim 1, wherein the bearing plate forms an angle comprised between 0° and 10° with respect to a horizontal plane, wherein the tool bearing structure comprises a pillar mounted with the ability to move in a linear translational movement with respect to the stand, and wherein the actuator is configured to set the tool bearing structure in motion in said linear translational movement.

8. The machine as claimed in claim 7, wherein said elastic means comprise at least one thrusting gas spring mounted between the tool bearing structure and the stand.

9. The machine as claimed in claim 1, wherein the machine further comprises elastic means connected between the stand and the tool bearing structure and configured to move the bead unseating tool away from the tire after unseating.

10. A machine for fitting and removing a tire with respect to a wheel, including a machine for unseating the bead of the tire from the wheel as claimed in claim 1.

* * * * *